United States Patent [19]

Davis et al.

[11] Patent Number: 5,292,012
[45] Date of Patent: Mar. 8, 1994

[54] TANK HANDLING AND PROTECTION STRUCTURE

[75] Inventors: Gail F. Davis; Brett L. Muckelrath, both of Duncan, Okla.

[73] Assignee: Halliburton Company, Duncan, Okla.

[21] Appl. No.: 993,865

[22] Filed: Dec. 22, 1992

[51] Int. Cl.$^5$ .............................................. B65D 87/00
[52] U.S. Cl. ....................................... 211/71; 211/13; 410/68; 220/1.5
[58] Field of Search ................... 211/71, 13, 189, 195; 410/54, 68; 220/1.5; 248/128

[56] References Cited

U.S. PATENT DOCUMENTS

| | | | |
|---|---|---|---|
| 2,056,179 | 10/1936 | Fitch | 410/68 |
| 4,061,391 | 12/1977 | Violette | 410/68 |
| 4,872,794 | 10/1989 | Davis et al. | 410/54 |
| 5,198,398 | 3/1993 | Van Duijn | 220/1.5 X |

OTHER PUBLICATIONS

Exhibit D-Brochure of Tycon Containers entitled, "The Safe and Economic Solution for Production, Storage and Transport" (Undated but admitted to be prior art).
Exhibit E-Brochure entitled "C-CAM Model 24B-001H Tank Container" of Custom Containers of America (Undated but admitted to be prior art).
Exhibit F-Brochure of Industrial Equipment & Engineering, Inc., entitled "Marine Portable Tanks" (Undated but admitted to be prior art).
Exhibit A-Det Norske Veritas Certificate Notes No. 2.7-1 entitled "Offshore Freight Containers Design and Certification", May, 1989.
Exhibit B-United Nations "Recommendations on the Transport of Dangerous Goods" (1990), Chapter 16, entitled Recommendations on Intermediate Bulk-Containers.
Exhibit C-International Maritime Organization "International Maritime Dangerous Goods Code" (1990), vol. I, Chapter 26.

*Primary Examiner*—Robert W. Gibson, Jr.
*Attorney, Agent, or Firm*—Stephen R. Christian; L. Wayne Beavers

[57] ABSTRACT

A tank handling and protection apparatus is particularly suitable for handling tanks carrying liquid additives for oil field servicing operations on offshore vessels. The apparatus includes a frame base and first and second mounting racks attached to the frame base each of those mounting racks having a full-size tank base location defined thereon. Releasable connecting devices are provided for releasably connecting at least one tank to each mounting rack. A protective cage is 10 attached to the frame base and surrounds the tank locations. The protective cage includes removable side walls which allow the tanks to be placed on the frame base with a forklift or the like. The protective cage also has top openings which allow the tanks to be placed on the mounting racks with a sling and crane lifting them through the top openings. The apparatus itself may also be handled with either the forklift or crane and sling. The tank handling and protection apparatus provides a fully certifiable transportable container for the tanks which allows easy access to and use of the tanks while they remain in the protective enclosure.

19 Claims, 2 Drawing Sheets

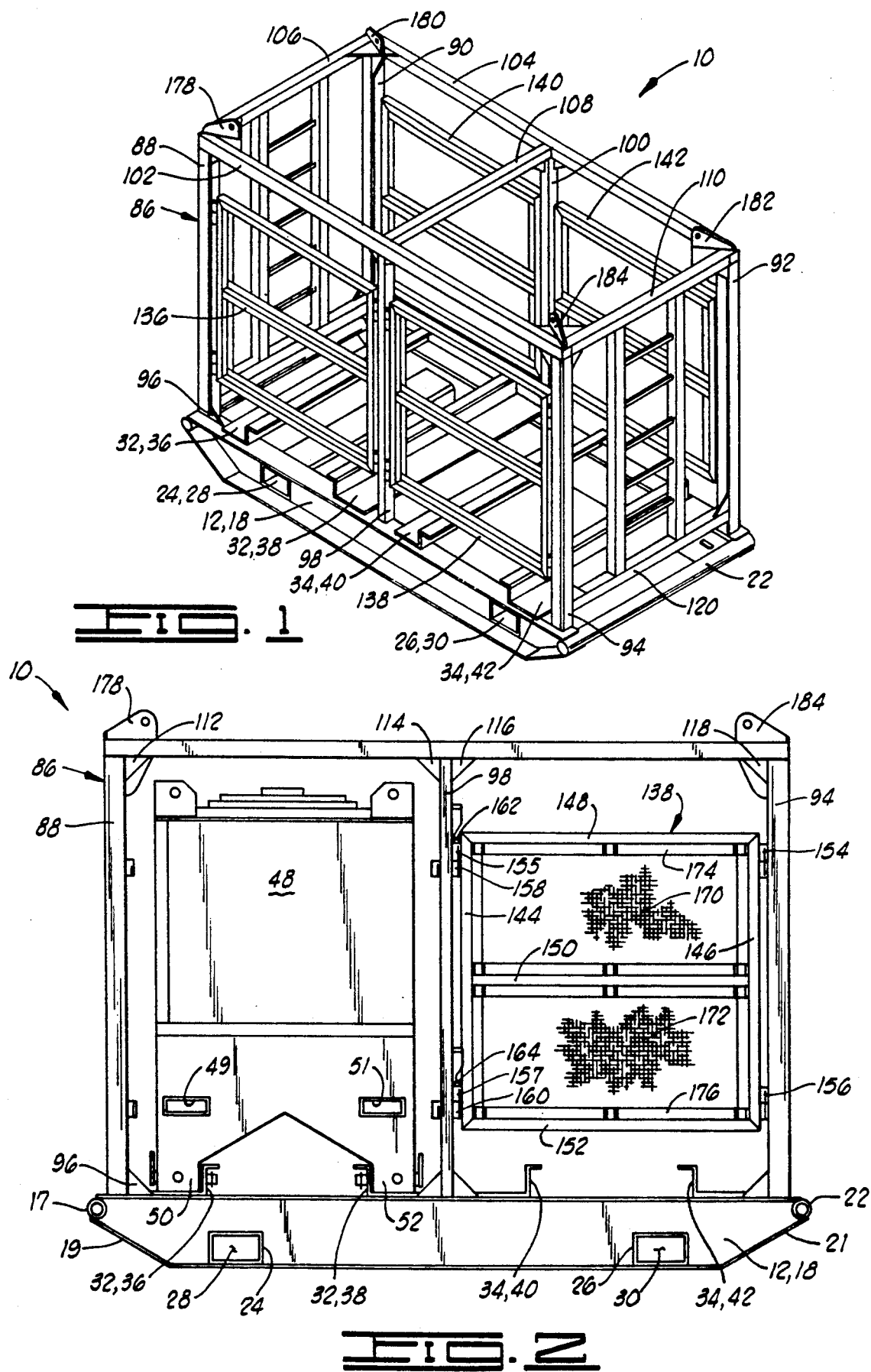

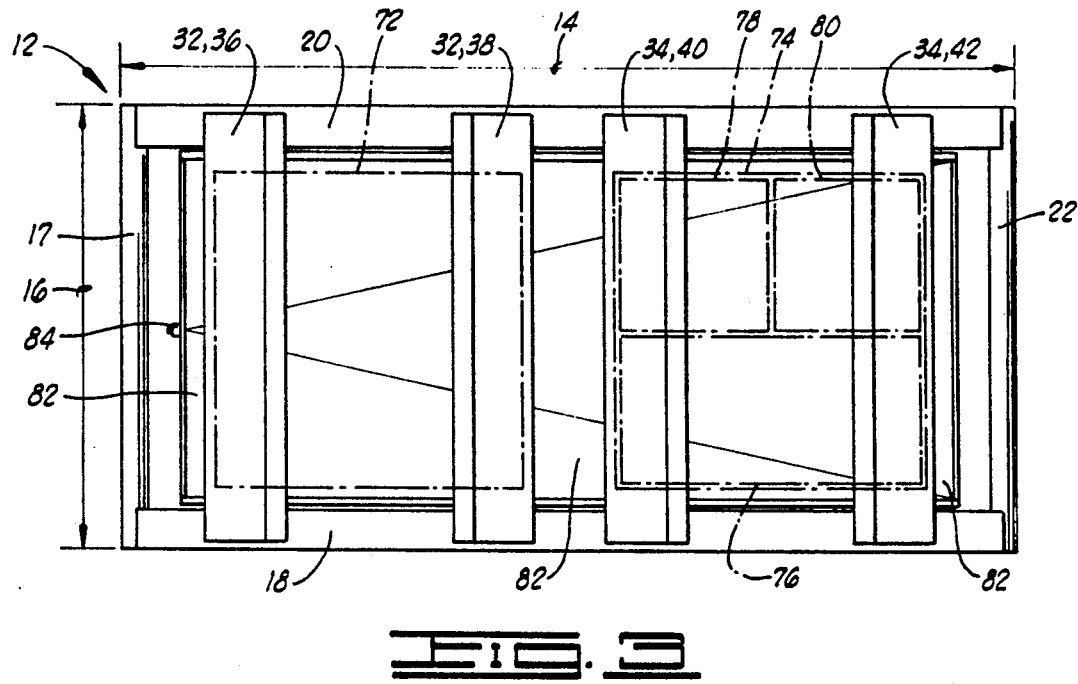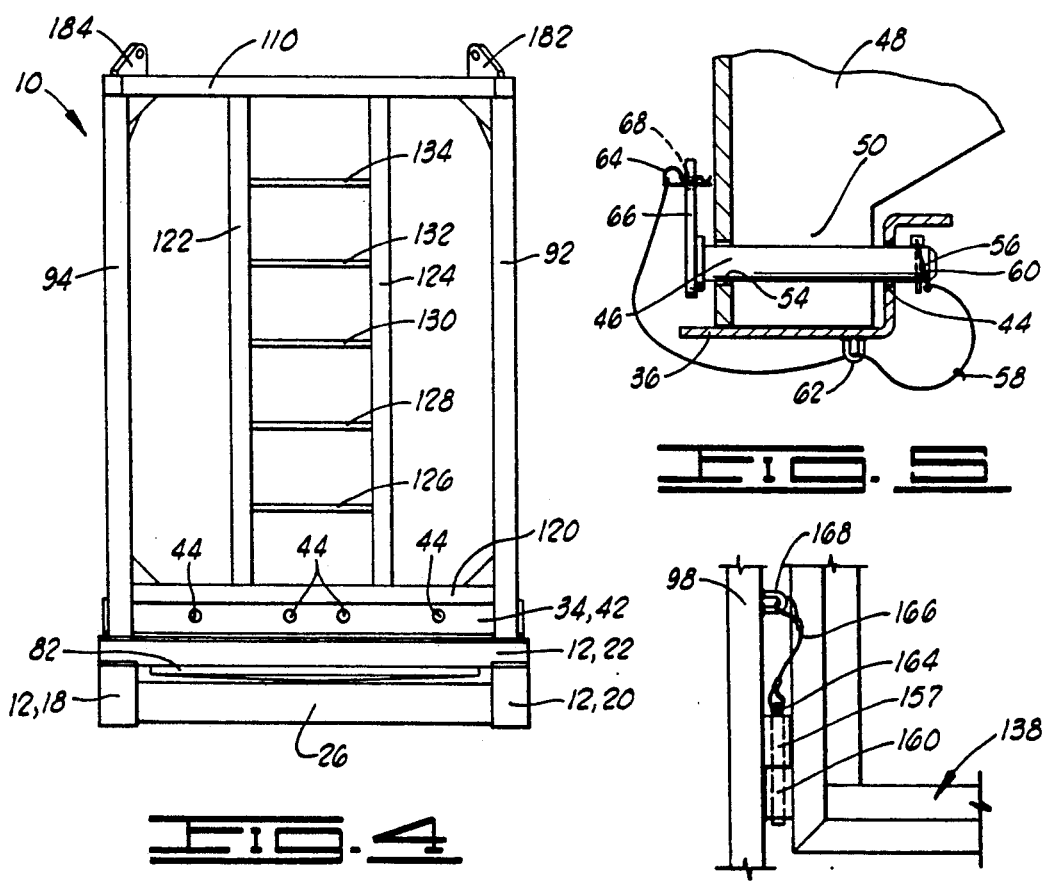

TANK HANDLING AND PROTECTION STRUCTURE

BACKGROUND OF THE INVENTION

1. Field Of The Invention

The present invention relates generally to apparatus for handling containers holding liquid additives for use in the oil well service industry, and more particularly, but not by way of limitation, to such structures which are suitable for handling such containers on offshore vessels.

2 DESCRIPTION OF THE PRIOR ART

Many activities conducted in the oil well servicing industry require the use of liquid materials which have typically been provided in fifty-five-gallon drums. There is a substantial cost involved in the handling and disposal of such drums which typically are not reused.

The prior art also includes a number of liquid container systems designed for reuse. One recent development in such systems is that shown and described in U.S. Pat. No. 4,872,794 to Davis et al., and assigned to the assignee of the present invention. The Davis et al. apparatus describes a truck-mounted system providing a tank mounting apparatus for removably mounting reusable additive storage tanks on the truck. The truck-mounted system is of course only usable on land-based operations.

There is a need for a reusable container system which can be utilized on offshore oil well servicing operations. A complication in this goal is the requirement of various certifying agencies that structures carrying dangerous materials such as the additives which may be used in well servicing, meet certain stringent requirements for physical protection of those dangerous materials.

Previously the art has addressed this problem with tanks which each include an individual protective cage attached to the tank.

Another approach of the prior art has been to place drums in a closed freight container. After the closed freight container is placed on the offshore vessel, the tanks must then be removed from the container to load or unload additive materials from the tanks.

SUMMARY OF THE INVENTION

The present invention provides an improved tank handling and protection apparatus especially suited for offshore use.

The apparatus includes a generally rectangular frame base having first and second mounting racks attached thereto, each of which mounting racks defines one full-size tank base location thereon.

Releasable connecting means are provided for releasably connecting at least one tank to each mounting rack. Optionally, instead of one full-size tank, each mounting rack can hold two half-size tanks, four quarter-size tanks, or one half-size and two quarter-size tanks.

A generally rectangular protective cage is attached to the frame base and surrounds the two tank locations on the four sides of the frame base. The two longer sides of the protective cage each include two removable side walls, preferably hinged doors. This provides doors on opposite sides of each tank location so that each tank can be inserted through either of the opposite side walls to place the tank on its mounting rack by means of a forklift truck or the like.

The cage further includes two shorter sides, each of which includes an integral ladder which provides both structural protection for the tanks and provides access to the top of the cage.

The top of the cage has two top openings defined therein, one above each tank base location. The top openings are sufficiently large that a full-size tank can be vertically moved through each of the top openings thus providing the option of placing the tanks on the tank mounting racks by lowering them through the top openings.

A plurality of lugs are attached to the upper portion of the cage. Also the frame base has forklift pockets defined therein. This provides the option of lifting the entire apparatus either with a sling and crane from the lugs, or with a forklift utilizing the forklift pockets.

This system allows a plurality of liquid additive tanks to be mounted thereon prior to placement of the apparatus on an offshore floating vessel. The base frame and cage function as a freight container which meets all code certifications and can be directly transported onto the offshore vessel by sling and crane or by forklift. The apparatus may then be simply placed on the offshore vessel and the additive metering tanks may be placed in use. Full access is provided to the various openings on the additive tanks to provide ease of use while they remain in the base frame and cage structure.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is an isometric view of the tank handling and protection apparatus of the present invention. The tanks are not in place on the apparatus. Further, the foraminous coverings on the side doors are not shown in order to clarify the illustration of other components of the structure.

FIG. 2 is a side elevation view of the apparatus of FIG. 1. The left-hand door has been removed to show a tank mounted on the frame base.

FIG. 3 is a plan view of the rectangular skid frame with the cage cut away therefrom. Two large squares shown in phantom lines designate first and second full-size tank base locations. Within the right-hand full-size tank base location smaller phantom line rectangles represent the location of the optional use of half-size tanks or pairs of quarter-size tanks.

FIG. 4 is an end elevation view of the apparatus of FIG. 1.

FIG. 5 is an enlarged view showing the detail of the releasable connectors which connect the tank legs to the mounting rails on the base frame.

FIG. 6 is an enlarged detailed view of the latch pins on the doors like the door of FIG. 2.

DETAILED DESCRIPTION OF THE PREFERRED EMBODIMENTS

FIG. 1 is an isometric view of the tank handling and protection apparatus of the present invention which is shown and generally designated by the numeral 10. In FIG. 1, a drip pan carried by the frame base has also been omitted for clarity of illustration.

The apparatus 10 includes a frame base 12 which is best shown in the plan view of FIG. 3.

The frame base 12 is generally rectangular in shape and has a length 14 and a width 16.

Frame base 12 includes first and second opposite, generally parallel base beams 18 and 20 which generally define the length 14 of frame base 12. First and second transverse pipe bumpers 17 and 22 are attached to and span between the base beams 18 and 20 at the left and right ends of base frame 12 as seen in FIG. 3.

First and second box beams 24 and 26 extend through and span between base beams 18 and 20 as best seen in FIG. 2. The box beams 24 and 26 are open at their ends so as to define forklift pockets 28 and 30 which allow the apparatus 10 to be picked up by a forklift truck.

As is best apparent in FIG. 2, the frame base 12 is constructed in a fashion generally referred to as a skid frame in that it has tapered lower surfaces such as 19 and 21 adjacent its narrower ends.

First and second mounting racks 32 and 34 are attached to the frame base 12. First mounting rack 32 includes a first pair of mounting rails 36 and 38 and second mounting rack 34 includes a second pair of mounting rails 40 and 42.

The cross-sectional shape of the mounting rails 36, 38, 40 and 42 are best seen in FIG. 2. An enlarged cross-sectional view of mounting rail 36 is seen in FIG. 5.

As best seen in FIG. 4, each of the mounting rails such as mounting rail 42 thereshown has four rail mounting holes 44 defined through a vertical flange thereof.

As best illustrated in FIG. 5, each of these holes may be utilized in association with a removable mounting pin 46 to mount a tank leg to one of the mounting rails.

In FIG. 2, a full-size tank is shown and generally designated by the numeral 48. The tank 48 has four legs, one at each corner, and two of those legs designated by the numerals 50 and 52 are seen in FIG. 2.

The tank 48 has forklift pockets such as 49 and 51 defined therein.

In FIG. 5, the mounting of tank leg 50 to rail 36 by pin 46 and mounting hole 44 is illustrated. As seen in FIG. 5, each tank leg has a leg mounting hole 54 defined therethrough through which the mounting pin 46 is received.

When the tank 48 is set in place on the rails 36 and 38, with the leg 50 in position on rail 36 as shown in FIG. 5, the leg mounting hole 54 is aligned with rail mounting hole 44 and the mounting pin 46 is inserted therethrough.

A pin retainer 56 is then attached to the free end of mounting pin 46. A cable 58 extends from a ring 60 on retainer 56 through a U-bolt 62 attached to rail 36 and is attached to a retainer clip 64. A handle 66 extends laterally from mounting pin 46. The retainer clip 64 extends through a hole 68 in handle 66.

The rail mounting holes 44 and leg mounting holes 54 in combination with the mounting pins 46 can be referred to as a releasable connecting means for releasably connecting tanks such as tank 48 to the mounting racks 32 and 34.

As shown in FIG. 3 in phantom lines, the racks 32 and 34 have first and second full-size tank base locations 72 and 74, respectively, defined thereon. For example, the full-size tank 48 shown in FIG. 2 substantially covers the plan area of first full-size tank base location 72 shown in phantom lines in FIG. 3. The tank 48 is substantially square in plan shape and has four legs at its corners which are connected to the outermost mounting holes 44 defined in the vertical flanges of mounting rails 36 and 38.

Also, each full-size tank base location 72 and 74 can accommodate a selection of smaller tanks. The smaller tanks individually will occupy either one-quarter or one-half of a full-size tank base location.

For example, it is shown in phantom lines within the second full-size tank base location 74 of FIG. 3 how a single half-size tank could be placed in the lower one-half 76 of full-size tank base location 74, and two quarter-size tank base locations 78 and 80 could be located within the upper half of full-size tank base location 74.

As is apparent in FIG. 3, the half-size tank base location 76 has a longer side or length generally parallel to the length 14 of frame base 12. It will be apparent that two half-size tank base locations could be located side by side within the full-size tank base location 74, with the lengths of those half-size tank base locations located parallel to the length 14 of frame base 12. Each of the half-size tanks will have four legs, one located at each corner. The laterally outward legs will be connected to outer mounting holes 44 in the mounting rails 40 and 42, and the laterally inward legs will be mounted on inner mounting holes 44 of mounting rails 40 and 42.

If it is desired to use quarter-size tanks such as those represented by the quarter-size tank base locations 78 and 80 seen in FIG. 3, it is necessary to join the two quarter-size tanks together at their contacting side and to bolt the quarter-size tanks together preferably by bolting their legs together. Only two legs of each quarter-size tank will actually be attached to the mounting rails 40 and 42. For example, in FIG. 3, the two legs on the left side of mounting base 78 will be attached to mounting rail 40, and the two legs on the right side of quarter-size tank location 80 will be attached to mounting rail 42. Thus, the pair of quarter-size tanks in locations 78 and 80 can be described as a pair of quarter-size tanks aligned parallel to the length of frame base 12.

In general, it will be apparent that the mounting racks such as 34 include a full-size tank base location 74, and a plurality of mounting means 44 for selectively mounting any chosen one of four tank base arrangements within the full-size tank base location 74, those four tank base arrangements being:

(1) one full-size tank base location such as tank base location 74;
(2) two half-size tank base locations arranged with their lengths parallel to a length of frame base 12, such as two half-size locations like 76;
(3) four quarter-size tank bases with attached pairs thereof aligned parallel to the length 14 of frame base 12, such as two pairs like the pairs 78 and 80; and
(4) half-size tank base such as 76 and two quarter-size tank bases such as 78 and 80.

Also, if it is desired to store dry materials, a tank base with a pallet mounted thereon instead of a tank can be used. Sacks of dry additives can then be stacked on the pallet.

The frame base 12 also has a drip pan 82 attached thereto and located below the mounting racks 32 and 34 and particularly located below the tank base locations 72 and 74 for collecting fluids which may leak from the tanks. Drip pan 82 preferably is a shallow, rectangular pan formed from stainless steel plate.

The end view of FIG. 4 illustrates the elevation location of drip pan 82.

The drip pan 82 preferably has a shallow slope toward one point thereof. As seen in FIG. 3, a drain plug 84 is centrally located on the left end of drip pan 82. Preferably, the drip pan 82 is deeper at its left end than its right end and also is sloped inward toward drain plug 84 so that all fluids collected on the drip pan 82 can be drained therefrom at drain plug 84.

A protective cage generally designated by the numeral 86 is attached to the frame base 12 and surrounds the first and second tank base location 72 and 74 generally along the outer perimeter of the four sides of frame base 12. As seen in FIG. 2, the protective cage 86 is taller than the individual tanks such as tank 48.

The cage 86 includes first, second, third and fourth corner columns 88, 90, 92 and 94. Each of the corner columns are welded to the top of a respective one of the base beams 18 and 20 along with suitable reinforcing gusset plates such as 96.

A first intermediate column 98 extends upward from base beam 18 midway between corner columns 88 and 94. A second intermediate column 100 extends upward from base beam 20 midway between corner columns 90 and 92.

The upper end of corner column 88, intermediate column 98 and corner column 94 are spanned by a first longer top beam 102. Columns 90, 100 and 92 are spanned by a second longer top beam 104.

A first shorter top beam 106 spans between columns 88 and 90. A second shorter top beam 108 spans between intermediate columns 98 and 100. A third shorter top beam 110 spans between corner columns 92 and 94. All of the intersecting beams are suitably reinforced by gussets such as gussets 112, 114, 116 and 118 seen in FIG. 2.

The top beams 102, 104, 106, 108 and 110 generally define an open top having two top openings therein located directly above the first and second tank base locations 72 and 74. These top openings allow the tanks to be placed on the tank base locations 72 and 74 by lifting them vertically through the openings defined in the open top framework.

It is apparent that the protective cage 86 has two longer sides running parallel to the base beams 18 and 20 and two shorter sides spanning between the base beams 18 and 20.

Each of the shorter sides are similarly constructed. For example, the rightmost shorter side as seen in FIGS. 1 and 4 includes a transverse beam 120 spanning between corner columns 92 and 94. The transverse beam 120 and the top beam 110 are joined by an integral ladder made up of ladder legs 122 and 124 and steps 126 through 134 spanning between legs 122 and 124.

The transverse beam 120 and the ladder made up of legs 122 and 124 and steps 126 through 134 provides both lateral
protection to the tanks located within cage 86 and also provides access to the top openings defined within the cage 86.

Each of the longer sides of cage 86 has a pair of doors defined therein. As seen in FIG. 1, the forwardmost facing long side which may be referred to as the front side defined between base beam 18 and top beam 102 has a first door 136 located between columns 88 and 98 and a second door 138 located between columns 98 and 94. The opposite or back side of the cage framework includes a third door 140 and a fourth door 142.

The doors 136 through 142 may also be generally referred to as removable side walls. The side walls may either be completely removed, or in case of the doors, may be swung open, to define side openings within the cage framework 86 through which the tanks such as 48 may be placed upon their associated tank base locations by moving them laterally through the side openings by the use of a forklift truck or the like.

Each of the doors 136–142 is of similar construction. Only one, namely the door 138 which is best seen in FIG. 2, will be described in detail.

The door 138 includes a door framework made up of vertical members 144 and 146 and upper, intermediate and lower horizontal members 148, 150 and 152 suitably welded together. The vertical member 146 is pivotally mounted to corner column 94 by upper and lower hinges 154 and 156. The hinges 154 and 156 are of such a construction that the door 138 can be lifted out of engagement with the hinges and completely removed if so desired.

The vertical member 144 carries hollow cylindrical latch pockets 155 and 157 which When the door 138 is in a closed position will be aligned with latch pockets 158 and 160 attached to intermediate column 98 so that latch pins 162 and 164 may be placed through the aligned latch pockets 155, 157, 158 and 160 to latch the door 138 in a closed position.

FIG. 6 is an enlarged view of the lower left corner of door 138. The upper end of a cylindrical latch pin 164 is attached by retaining cable 166 to a U-bolt 168 on intermediate column 98.

Preferably the doors such as door 138 have their interior covered by a fiberglass mesh or other foraminous covering such as indicated at 170 and 172. The foraminous coverings 170 and 172 preferably are carried by covering frameworks such as 174 and 176 which are attached within the door framework of door 138.

The door frame members 144, 146, 148, 150 and 152 define a perimeter door frame having open interiors covered by the coverings 170 and 172.

Attached to the cage 86 at the upper ends of corner columns 88, 90, 92 and 94 are four lifting lugs 178, 180, 182 and 184. The lifting lugs are arranged and constructed so that the apparatus 10 may be lifted by the lifting lugs which will be attached to a conventional sling and crane assembly.

The base frame 12 and the protective cage 86 must be structurally dimensioned and constructed so that the apparatus 10 may be lifted when loaded with tanks which themselves are fully loaded with liquid additives.

This construction provides great flexibility both in the handling of the individual tanks such as tank 48 and in the handling of the assembled apparatus 10 carrying the tanks. Each individual apparatus or the overall assembly may either be handled by a conventional forklift or by a sling and crane assembly.

If it is desired to handle the apparatus with a sling and crane, the tanks such as tank 48, may be placed upon the apparatus 10 by lowering them through the top openings defined within the protective cage 86. Then the overall assembly 10 may be loaded onto an offshore vessel by connecting a sling and crane assembly to the lifting lugs 178–184. On the other hand, if it is desired to accomplish the handling of the structures with a forklift, the tanks may be placed on the mounting racks 32 and 34 by opening appropriate ones of the doors 136–142 to define a side opening in the protective cage 86 and then moving the tanks laterally with a forklift truck through those side openings and setting them on the appropriate mounting rack 32 or 34. Subsequently the entire apparatus 10 may also be picked up by placement of forklift arms in forklift pockets 28 and 30 for transport of the apparatus 10 onto an offshore vessel.

Preferably the apparatus 10 is designed to meet the structural requirements of an "offshore freight container" 0 and certified to DNV certification notes nos. 2.7-1, "Offshore Freight Containers Design and Certification", May, 1989. The tank 48 is preferably constructed to meet the certification requirements of the International Maritime Dangerous Goods Code, Chapter 26, and United Nations recommendations on the transport of dangerous goods, UN Ch. 16, These regulatory codes are incorporated herein by reference.

Particularly, the protective cage 86 is designed to protect the tanks against rupture if the apparatus 10 swings against the side of an offshore platform while it is being lifted onto the platform. Protection is also provided if the apparatus is dropped onto the platform.

Thus it is seen that the apparatus of the present invention readily achieves the ends and advantages mentioned as well as those inherent therein. While certain preferred embodiments of the invention have been illustrated and described for purposes of the present disclosure, numerous changes may be made by those skilled in the art which changes are encompassed within the scope and spirit of the present invention as defined by the appended claims.

What is claimed is:

1. A tank handling and protection apparatus, comprising:
   a frame base;
   a mounting rack attached to said frame base, and having at least one tank base location defined thereon;
   releasable connecting means for releasably connecting at least one tank to said mounting rack; and
   a protective cage attached to said frame base and surrounding said tank location, said cage including at least one removable side wall to permit said tank to be inserted through an opening formed by removal of said side wall to place said tank on said mounting rack.

2. The apparatus of claim 1, wherein:
   said cage includes two of said removable side walls on opposite sides of said tank base location so that said tank can be inserted through openings formed by removal of either of said side walls to place said tank on said mounting rack.

3. The apparatus of claim 1, wherein:
   said removable side wall includes a door and a hinge mounting said door within said cage so that said opening is formed by swinging said door open.

4. The apparatus of claim 3, wherein:
   said door includes a perimeter door frame having an open interior covered by a foraminous covering.

5. The apparatus of claim 1, wherein:
   said cage includes an open top having a top opening sufficiently large that said tank may pass vertically through said top opening, said cage being taller than said tank.

6. The apparatus of claim 5, wherein:
   said cage includes an integral ladder providing both lateral protection to said tank and providing access to said top opening and thus to a top of said tank.

7. The apparatus of claim 1, further comprising:
   lifting lugs attached to a top of said cage, said frame base, said cage and said lifting lugs being so arranged and constructed that said apparatus and said tank may be lifted by said lifting lugs with said tank fully loaded.

8. The apparatus of claim 1, wherein:
   said frame base includes forklift pockets arranged and constructed so that said apparatus may be lifted by a forklift truck.

9. The apparatus of claim 1, wherein:
   said frame base is a skid frame base.

10. The apparatus of claim 1, wherein:
    said frame base is generally rectangular in plan shape and has a length and a width, said frame base including two opposite generally parallel base beams defining two longer sides of said frame base;
    said mounting rack includes first and second mounting rails spanning said width of said frame base between said base beams, said first and second mounting rails having said tank base location defined thereon; and
    said releasable connecting means includes a plurality of mounting holes defined in said mounting rails, and a plurality of removable pins receivable through said mounting holes and through holes in legs of said tank for holding said tank in place on said mounting rails.

11. The apparatus of claim 1, further comprising:
    a drip pan located below said tank base location.

12. The apparatus of claim 1, wherein:
    said mounting rack includes said tank base location being a full-size tank base location, and said mounting rack includes a plurality of mounting means for selectively mounting any chosen one of four tank base arrangements within said full-size tank base location, said four tank base arrangements being:
    (1) one full-size tank base;
    (2) two half-size tank bases arranged with their lengths parallel to a length of said frame base;
    (3) four quarter-size tank bases with attached pairs thereof aligned parallel to said length of said frame base; and
    (4) one half-size and two quarter-size tank bases.

13. A tank handling and protection apparatus, comprising:
    a rectangular frame base including first and second spaced parallel base beams defining a length of said rectangular frame base, a spacing between said beams generally defining a width of said frame base, said width being less than said length;
    first and second mounting racks attached to said base frame, and having first and second generally rectangular full-size tank base locations, defined thereon, respectively, said first and second mounting racks including first and second pairs of parallel mounting rails spanning said width of said frame base between said base beams, said first and second pairs of mounting rails having said first and second tank base locations defined thereon, respectively;
    at least a first and a second tank mounted upon said first and second mounting racks, respectively; and
    a protective cage attached to said frame base, said cage being taller than said tanks and surrounding said first and second tank base locations along all four sides of said frame base.

14. The apparatus of claim 13, wherein:
    said cage has first and second longer sides including first and second pairs of doors defined in said first and second longer sides; respectively, so that one of said doors is located adjacent each of said full-size tank base locations in each of said longer sides of said cage so that said tanks can be placed on or removed from said tank base locations by inserting said tanks through openings formed by opening said doors.

15. The apparatus of claim 13, wherein:
said cage includes an open top having two top openings located above said tank base locations, said top openings being sufficiently large that a full-size tank may pass vertically therethrough.

16. The apparatus of claim 15, wherein:
said cage has first and second shorter sides including first and second integral ladders, respectively, said ladders providing both lateral protection to said tanks and access to said top openings.

17. The apparatus of claim 13, further comprising:
said mounting rails each having a plurality of rail mounting holes defined therein;
said tanks each having tank legs having leg mounting holes defined therein; and
a plurality of removable pins received through said rail mounting holes and said leg mounting holes to attach said tanks to said mounting rails.

18. The apparatus of claim 13, wherein:
each of said mounting racks includes a plurality of mounting means for selectively mounting any chosen one of four tank base arrangements within each of said full-size tank base locations, said four tank base arrangements being:
(1) one full-size tank base;
(2) two half-size tank bases arranged with their lengths parallel to said length of said frame base;
(3) four quarter-size tank bases with attached pairs thereof aligned parallel to said length of said frame base; and
(4) one half-size and two quarter-size tank bases.

19. A tank handling and protection apparatus, comprising:
a rectangular frame base including first and second spaced parallel base beams defining a length of said rectangular frame base, a spacing between said beams generally defining a width of said frame base, said width being less than said length;
first and second mounting racks attached to said base frame, and having first and second generally rectangular full-size tank base locations, defined thereon, respectively, said first and second mounting racks including first and second pairs of parallel mounting rails spanning said width of said frame base between said base beams, said first and second pairs of mounting rails having said first and second tank base locations defined thereon, respectively;
at least a first and a second tank mounted upon said first and second mounting racks, respectively;
a protective cage attached to said frame base, said cage being taller than said tanks and surrounding said first and second tank base locations along all four sides of said frame base;
said cage having first and second longer sides including first and second pairs of doors defined in said first and second longer sides, respectively, so that one of said doors is located adjacent each of said full-size tank base locations in each of said longer sides of said cage so that said tanks can be placed on or removed from said tank base locations by inserting said tanks through openings formed by opening said doors;
said cage including an open top having two top openings located above said tank base locations, said top openings being sufficiently large that a full-size tank may pass vertically therethrough;
said cage having first and second shorter sides including first and second integral ladders, respectively, said ladders providing both lateral protection to said tanks and access to said top openings; and
each of said mounting racks including a plurality of mounting means for selectively mounting any chosen one of four tank base arrangements within each of said full-size tank base locations, said four tank base arrangements being:
(1) one full-size tank base;
(2) two half-size tank bases arranged with their lengths parallel to said length of said frame base;
(3) four quarter-size tank bases with attached pairs thereof aligned parallel to said length of said frame base; and
(4) one half-size and two quarter-size tank bases.

* * * * *